United States Patent
Sharifi et al.

(10) Patent No.: US 9,508,023 B1
(45) Date of Patent: *Nov. 29, 2016

(54) TRANSFORMATION INVARIANT MEDIA MATCHING

(71) Applicant: Google Inc., Mountain View, CA (US)

(72) Inventors: Matthew Sharifi, Palo Alto, CA (US); Sergey Ioffe, Mountain View, CA (US); Jay Yagnik, Mountain View, CA (US); Gheorghe Postelnicu, Zürich (CH); Dominik Roblek, Mountain View, CA (US); George Tzanetakis, Victoria (CA)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/257,683

(22) Filed: Apr. 21, 2014

Related U.S. Application Data

(63) Continuation of application No. 13/362,905, filed on Jan. 31, 2012, now Pat. No. 8,738,633.

(51) Int. Cl.
  *G06F 17/30* (2006.01)
  *G06K 9/62* (2006.01)
  *G06K 9/00* (2006.01)

(52) U.S. Cl.
  CPC ......... *G06K 9/6267* (2013.01); *G06K 9/00013* (2013.01); *G06F 17/30244* (2013.01)

(58) Field of Classification Search
  None
  See application file for complete search history.

(56) References Cited

U.S. PATENT DOCUMENTS

| | | | |
|---|---|---|---|
| 8,156,132 B1 | 4/2012 | Kaminski | |
| 2005/0033523 A1 | 2/2005 | Abe et al. | |
| 2007/0179921 A1 | 8/2007 | Zitnick et al. | |
| 2007/0217676 A1 | 9/2007 | Grauman et al. | |
| 2009/0276216 A1* | 11/2009 | Amini et al. | 704/236 |
| 2009/0276468 A1 | 11/2009 | Menon et al. | |
| 2012/0321175 A1 | 12/2012 | Hedau et al. | |

OTHER PUBLICATIONS

Shazam, http://www.shazam.com, Last accessed Apr. 24, 2012.
Lu, Jian, "Video Fingerprinting and Applications: a review," Media Forensics & Security Conference, Vobile, Inc., San Jose, CA, http://www.slideshare.net/jianlu/videofingerprintingspiemfs09d, Last accessed May 30, 2012.
Media Hedge, "Digital Fingerprinting," White Paper, Civolution and Gracenote, 2010, http://www.civolution.com/fileadmin/bestanden/white%20papers/Fingerprinting%20-%20by%20 Civolution%20and%20Gracenote%20-%202010.pdf, Last accessed May 30, 2012.
Milano, Dominic, "Content Control: Digital Watermarking and Fingerprinting," White Paper, Rhozet, a business unit of Harmonic Inc., http://www.rhozet.com/whitepapers/Fingerprinting_Watermarking.pdf, Last accessed May 30, 2012.
Lu, Jian, "Video fingerprinting for copy identification: from research to industry applications," Proceedings of SPIE-Media Forensics and Security XI, vol. 7254, Jan. 2009, http://idm.pku.edu.cn/jiaoxue-MMF/2009/VideoFingerprinting_SPIE-MFS09.pdf, Last accessed May 30, 2012.
Ioffe, S., "Improved Consistent Sampling, Weighted Minhash and L1 Sketching," 2010 IEEE International Conference on Data Mining, 2010, pp. 246-255.

* cited by examiner

*Primary Examiner* — Hung Q Pham
(74) *Attorney, Agent, or Firm* — Fenwick & West LLP

(57) ABSTRACT

This disclosure relates to transformation invariant media matching. A fingerprinting component can generate a transformation invariant identifier for media content by adaptively encoding the relative ordering of interest points in media content. The interest points can be grouped into subsets, and stretch invariant descriptors can be generated for the subsets based on ratios of coordinates of interest points included in the subsets. The stretch invariant descriptors can be aggregated into a transformation invariant identifier. An identification component compares the identifier against a set of identifiers for known media content, and the media content can be matched or identified as a function of the comparison.

14 Claims, 12 Drawing Sheets

US 9,508,023 B1

TRANSFORMATION INVARIANT MEDIA MATCHING

CROSS-REFERENCE TO RELATED CASES

This application is a continuation of U.S. patent application Ser. No. 13/362,905, filed Jan. 31, 2012, and entitled, "TRANSFORMATION INVARIANT MEDIA MATCHING," the entirety of which is incorporated herein by reference.

TECHNICAL FIELD

This disclosure generally relates to media matching, and in particular to systems and methods that facilitate transformation invariant media matching.

BACKGROUND

Internet media sharing enables users to share media content virtually anywhere at any time, as long as they have access to a media capable device with an internet connection. The convenience of being able to view media content via the internet, essentially on demand, has resulted in explosive growth of internet media viewing. Internet media traffic is currently near a majority of consumer internet traffic, and the rate of demand is projected to continue increasing.

People have the ability to quickly identify or recognize known media content that has undergone a transformation, such as a popular song that has been slowed down, or when a person other than an original artist is covering a known song in a user created video or audio recording. However, transformations of media content such as temporal stretches, aspect ratio alterations, and so forth have proven difficult and computationally expensive for computer recognition systems.

Typically, conventional systems for media content matching extract features from the media content with fixed reference frames. The fixed reference frames cause the extracted features to be brittle when subjected to various transformations, such as time stretching. As a result, many conventional systems for media matching experience performance degradation when the media content is subject to transformations.

SUMMARY

The following presents a simplified summary of the specification in order to provide a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

According to an aspect of the subject innovation, systems and methods for transformation invariant media matching are disclosed. A fingerprinting component can generate a transformation invariant identifier for media content by adaptively encoding the relative ordering of interest points in media content. The interest points can be determined based on a set of interest point determination criteria. An identification component compares the identifier against a set of identifiers for known media content, and the media content can be matched or identified as a function of the comparison.

In an embodiment, a reference component determines interest points in a signal image; a grouping component groups the interest points into respective sets of interests points based on a set of grouping criteria; a descriptor component determines descriptors for the respective sets of interest points; and a histogram component aggregates the descriptors into a histogram.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Overview

Figure 1:
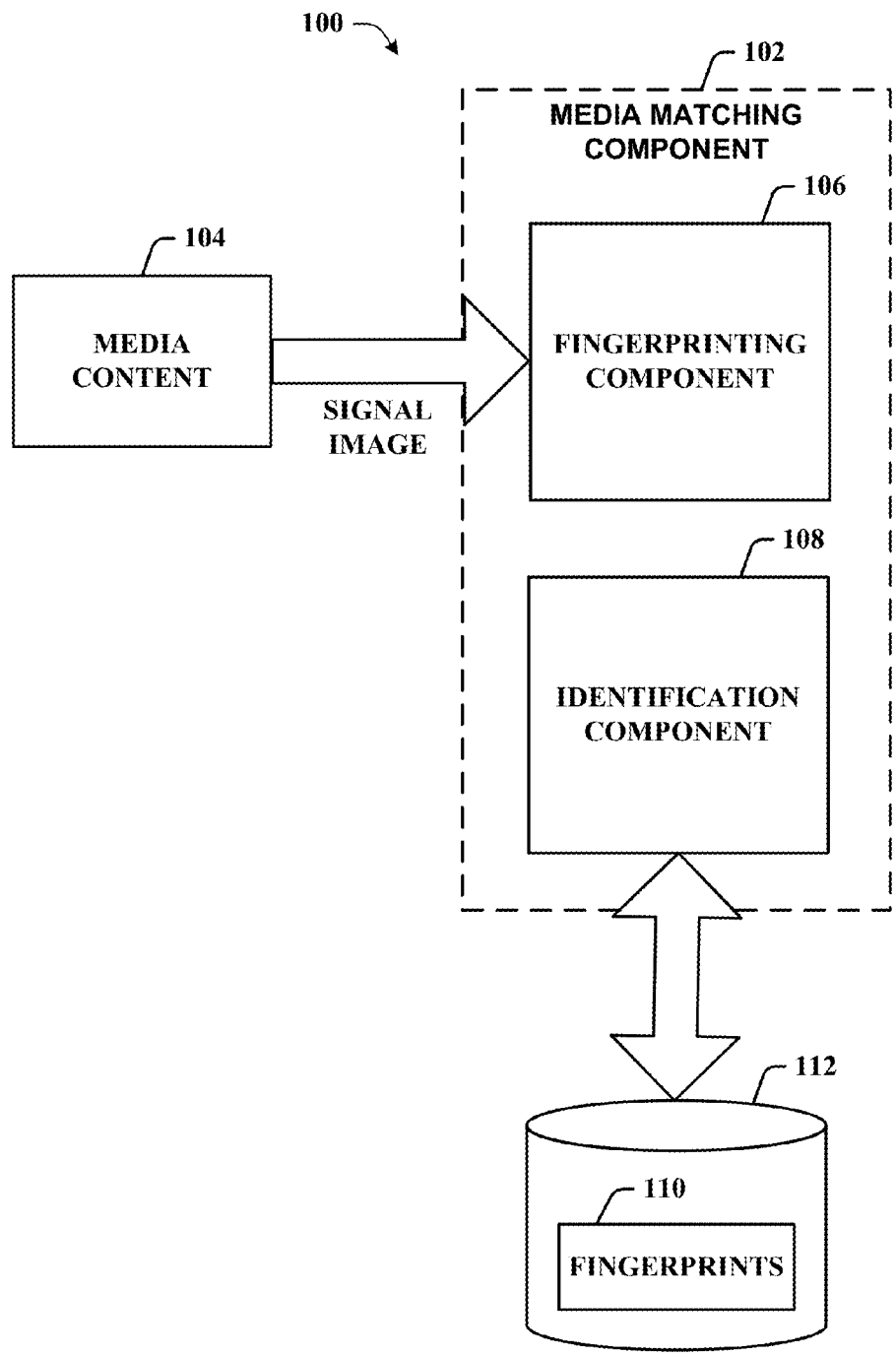
FIG. 1 illustrates an example system for transformation invariant media matching in accordance with various aspects described in this disclosure.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

As noted in the Background section, techniques for media content matching that extract features from the media content with fixed reference frames often experience performance degradation when the media content is subject to transformations. The fixed reference frames cause the extracted features to be brittle when subjected to various transformations, such as time stretching. As a consequence, matching media, using such techniques, that has been subject to transformations can be difficult and computationally expensive.

One non-limiting implementation of the innovation provides efficient and accurate transformation invariant media matching. The implementation adaptively encodes the relative ordering of interest points in the media content to generate identifiers for the media content that are transformation invariant. The identifiers are compared to identifiers of known media content for matching or identification.

More particularly, in accordance with an embodiment, a fingerprinting component determines a transformation invariant identifier for media content. The fingerprinting component adaptively encodes the relative ordering of interest points in the media content into stretch invariant descriptors, and aggregates the descriptors into an identifier. An identification component compares the identifier against a set of identifiers for known media content, and the media content can be identified or matched as a function of the comparison.

Non-Limiting Examples of Filter Based Object Detection Using Hash Functions

Turning now to FIG. 1, illustrated is an example system 100 for transformation invariant media matching in accordance with various aspects described in this disclosure. Generally, system 100 can include a memory that stores computer executable components and a processor that executes computer executable components stored in the memory, examples of which can be found with reference to FIG. 12. System 100 includes a media matching component 102. The media matching component 102 recognizes, identifies, or otherwise determines an identity of media content 104 (e.g., media file, media data, etc.) by matching the media content 104, or a portion of the media content 104, with known media content, or a portion of known media content. The media content 104 can include audio data and/or image data (e.g., video data, photographic data, or graphical representations of data). For example, the media content 104 can include a video uploaded to a media hosting service by a user, and the media matching component 102 can determine the identity of audio data and/or video data included in the video by matching the audio data and/or video data with known media content.

The media matching component 102 includes a fingerprinting component 106, and an identification component 108. The fingerprinting component 106 determines, provides, or otherwise generates a transformation invariant identifier (e.g., identifier or fingerprint) using interest points (e.g., reference points or signal markers) included in a signal image associated with the media content 104. The signal image can include but is not limited to a spectrogram, a waveform plot, an image, and/or a set of images. For example, in an exemplary implementation, the fingerprinting component 106 groups interest points into respective sets of interest points, and generates stretch invariant descriptors using the respective sets of interest points. The fingerprinting component 106 generates the transformation invariant identifier by aggregating the descriptors into a histogram, and/or generating one or more hash values using the histogram.

The identification component 108 compares the identifier generated by the fingerprinting component 106 against a set of fingerprints (e.g., identifiers) 110 for known media content, and determines an identity of the media content 104 (or portion of the media content) based at least in part on the comparison. For example, the identification component 108 can determine an identity of the media content 104 based on the comparison, where the comparison satisfies a set of identification criteria, such as satisfying a predetermined identification matching threshold. Additionally or alternatively, the identification component 108 can employ the identifier to lookup a fingerprint in the set of fingerprints 110. For example, in one implementation, the identifier includes a hash value, and the identification component 108 employs the hash value to lookup a fingerprint 110 in a hash table. It is to be appreciated that although the set of fingerprints 110 are illustrated as being maintained in the data store 112, such implementation is not so limited. For instance, the set of fingerprints 110 can be maintained in another location, and the identification component 108 may access the set of fingerprints 110, for example, via a network connection.

Figure 2:
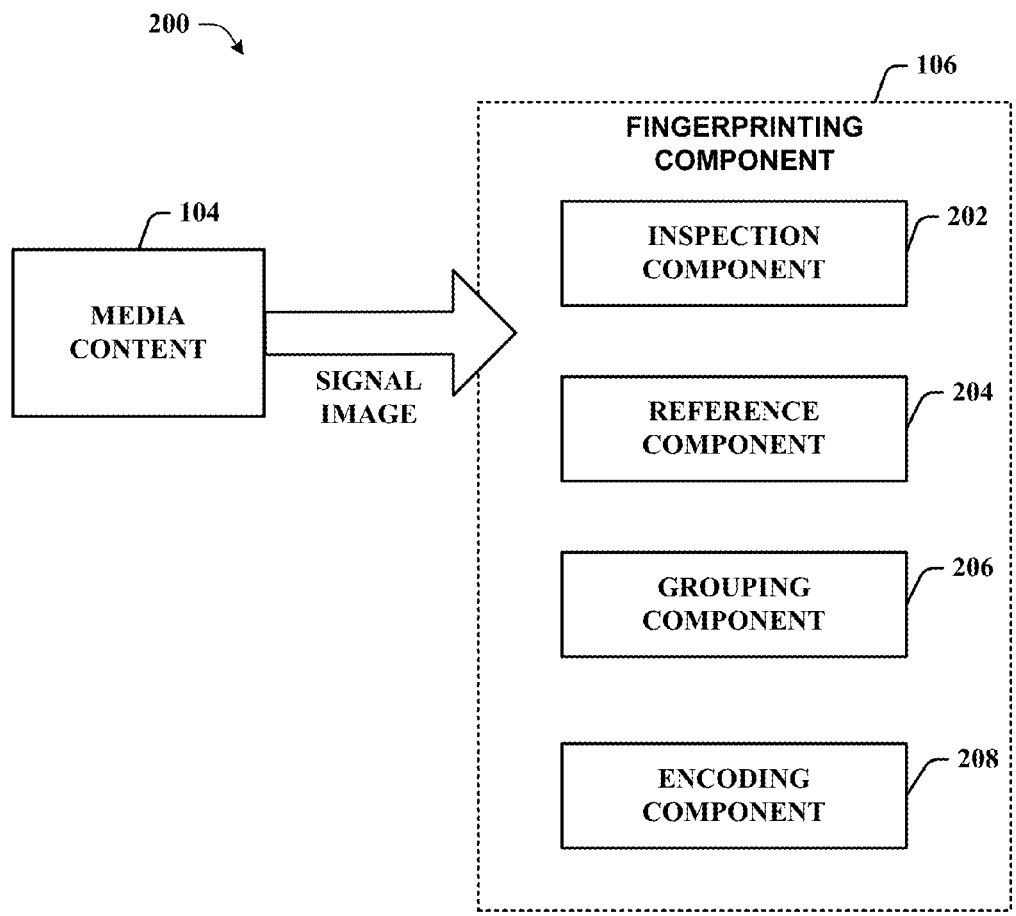
FIG. 2 illustrates an example fingerprinting component in accordance with various aspects described in this disclosure.

FIG. 2 illustrates an example fingerprinting component 106 in accordance with various aspects described in this disclosure. As discussed, the fingerprinting component 106 generates a transformation invariant identifier (e.g., identifier or fingerprint) using interest points (e.g., reference points or signal markers) included in media content 104. The fingerprinting component 106 in FIG. 2 includes an inspection component 202, a reference component 204, a grouping component 206, and an encoding component 208. The inspection component 202 inspects, examines, or otherwise analyzes the media content 104, and determines or generates a signal image for the media content 104 based on the analysis. As discussed, the signal image can include but is not limited to a spectrogram, a waveform plot, an image, and/or a set of images.

The reference component 204 selects, detects, or otherwise determines a set of interest points (e.g., reference points or stable points) in the signal image for the media content 104 based in part on a set of interest point selection criteria. The interest point selection criteria can include but is not limited to satisfaction of a predetermined response threshold when compared to a filter, and/or a predetermined reference point location. For example, in one implementation, the reference component 204 selects peaks in a spectrogram as interest points.

The grouping component 206 divides, partitions, or otherwise groups interest points in the set of interest points into subsets of interest points based on a set of grouping criteria. The set of grouping criteria can include but is not limited to a predetermined size of the subsets, a predetermined quantity of groups, and/or a stability of the interest points. For example, in one implementation, the grouping component 206 determines a quantity of groups inversely proportional to the stability of the interest points. For instance, the grouping component 206 can generate a lesser quantity of groups for a first set of interest points having a first stability, and a greater quantity of groups for a second set of interest points having a second stability, where the first stability is greater than the second stability. The encoding component 208 generates stretch invariant descriptors using the respective subsets of interest points, and aggregates the descriptors into a transformation invariant identifier. For example, in one implementation, the encoding component 208 aggregates the descriptors into a histogram over a window of time.

Figure 3:
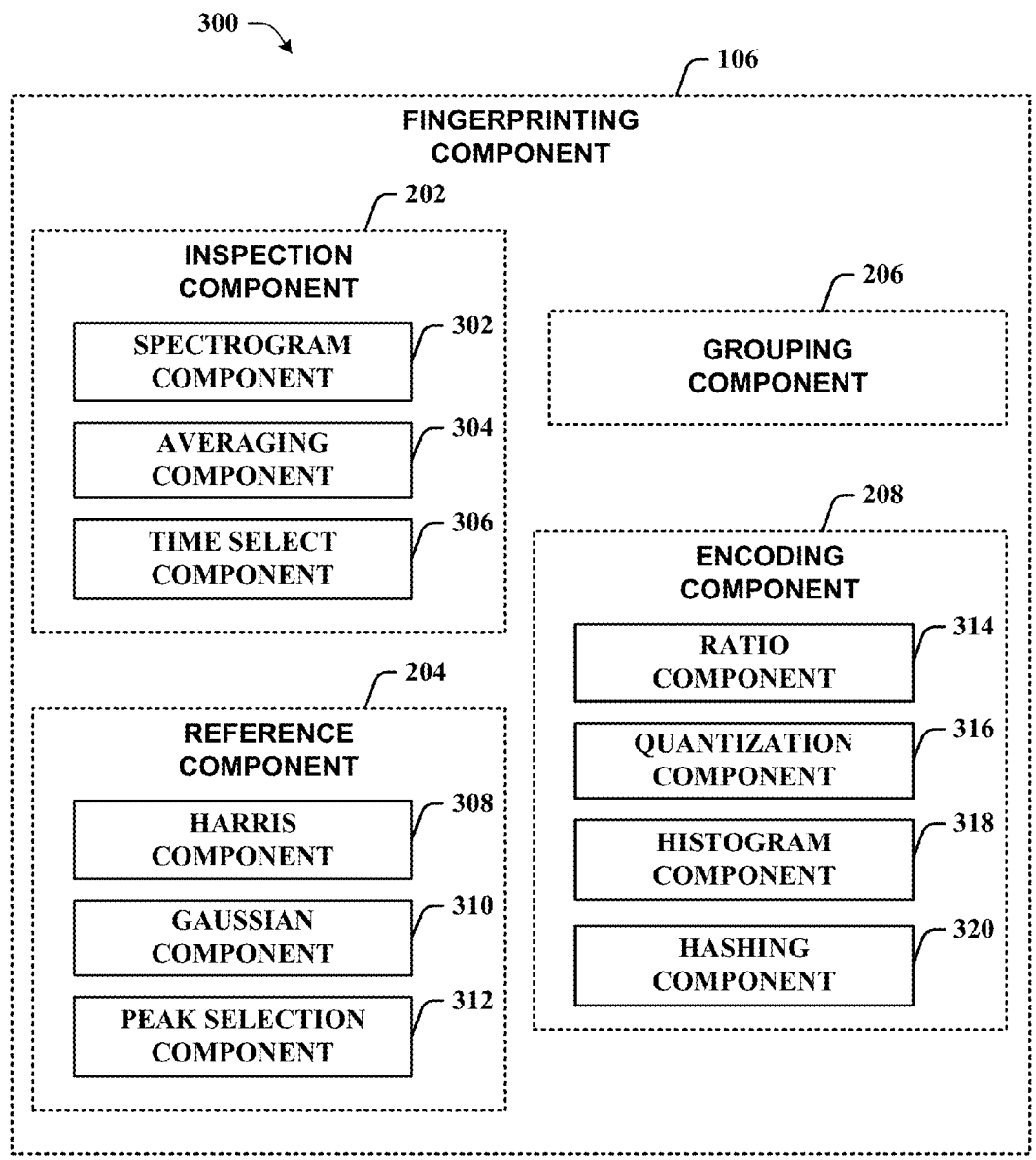
FIG. 3 illustrates an example fingerprinting component in accordance with various aspects described in this disclosure.

Referring to FIG. 3, illustrated is an example fingerprinting component 106 in accordance with various aspects described in this disclosure. As discussed, the fingerprinting component 106 generates a transformation invariant identifier (e.g., identifier or fingerprint) using interest points (e.g., reference points or signal markers) included in media content 104. The fingerprinting component 106 in FIG. 3 includes an inspection component 202, a reference component 204, a grouping component 206, and an encoding component 208.

As discussed, the inspection component 202 analyzes the media content 104, and determines or generates a signal image for the media content 104 based on the analysis. The inspection component 202 in FIG. 3 includes a spectrogram component 302, an averaging component 304, and a time select component 306. The spectrogram component 302 computes or generates a spectrogram (e.g., signal image) for audio data included in the media content 104 by applying fast Fourier transforms (FFTs) over windows of an audio signal corresponding to the audio data.

Video data included in the media content 104 can include a set of images (e.g., frames) that are displayed sequentially at a given time rate (e.g., 60 frames per second). The averaging component 304 generates averaged subsets of video data (e.g., frames) included in the media content 104. For example, the averaging component 304 can average sets of 30 frames included in video data having 300 frames to generate 10 averaged frames (e.g., signal images) (discussed in greater detail with reference to FIG. 7).

The time select component 306 selects frames in video data included in the media content 104 at a set of predetermined times and/or predetermined time intervals. For example, video data included in the media content 104 can have 300 frames that are displayed at 50 frames per second. The time select component 306 can select a frame included in the video data every half (½) second, resulting in 6 signal images (e.g., frames).

It is to be appreciated that the spectrogram component 302, averaging component 304, and/or time select component 306 can be employed in combination by the inspection component 202. For example, the media content 104 can include a video having audio data and image data. The spectrogram component 302 can generate a spectrogram for the audio data included in the video, and the averaging component 304 can generate a set of averaged frames for the video data included in the video. Additionally or alternatively, the inspection component 202 can determine that the signal image is included in the media content 104. For example, the media content 104 can include image data (e.g., photograph, etc.), wherein the image data is the signal image.

As discussed, the reference component 204 selects, detects, or otherwise determines a set of interest points (e.g., reference points or stable points) in the signal image for the media content 104 based in part on a set of interest point selection criteria. The interest point selection criteria includes but is not limited to satisfaction of a predetermined response threshold when compared to a filter, and/or a predetermined reference point location. The reference component 204 in FIG. 3 includes a Harris component 308, a Gaussian component 310, and a peak selection component 312. In one implementation, the reference component 204 can employ the Harris component 308, the Gaussian component 310, and/or the peak selection component 312, individually or in any combination thereof, to facilitate determining the set of interest points in the signal image.

The Harris component 308 employs a Harris operator to facilitate detection of interest points in a signal image for audio data and/or image data. For example, in one implementation, the reference component 204 selects interest points in the signal image having a response to the Harris operator that satisfies a Harris operator response threshold. The Harris operator facilitates determining interest points having a strong invariance to transformations including but not limited to rotation, scale, illumination variation, and/or image noise.

The Gaussian component 310 employs a Laplacian of Gaussian (LoG) filter and/or a difference of Gaussians to facilitate detection of interest points in the signal image for audio data and/or image data. For example, in one implementation, the reference component 204 selects interest points in the signal image having a response to the LoG filter that satisfies a LoG filter response threshold.

The peak selection component 312 determines peaks (e.g., interest points) that are local maxima in a time-frequency window of a signal image (e.g., spectrogram) for audio data. The peaks determined by the peak selection component 312 are likely to remain in noisy or distorted audio data, and provide stable interest points. It is to be appreciated that the foregoing represents but a few examples, and aspects of the innovation are not limited to a particular technique for determining interest points in the signal image.

As discussed, the grouping component 206 groups interest points in the set of interest points into subsets of interest points based on a set of grouping criteria. The set of grouping criteria can include but is not limited to a predetermined size of the subsets, a predetermined quantity of groups, and/or a stability of the interest points. For example, in one implementation, the grouping component 206 groups interest points in the set of interest points into triangles or subsets having three interest points (e.g., generates sets of triples). Aspects of the innovation are not limited to a particular technique for generating sets of triples. For example, the grouping component 206 can compute, calculate, or otherwise determine a Delaunay triangulation for interest points included in the set of interest points to generate sets of triples. As an additional example, the grouping component 206 can determine a quantity of possible triples in the set of interest points, and for n interest points generate n^3 triples, where n is an integer. As yet another example, the grouping component 206 can determine subsets of two interest points in the set of interest points, and select a third interest point for each subset of two interest points. As still another example, the grouping component 206 can select two interest points based on respective distances from a first interest point. For instance, the grouping component 206 can select two interest points having the shortest respective distances to the first interest point. The distance can be measured in Euclidean distance, or can be the distance on one axis (e.g., x-axis).

As discussed, the encoding component 208 generates stretch invariant descriptors using the respective subsets of interest points (e.g., triples), and aggregates the descriptors into a transformation invariant identifier. The encoding component 208 in FIG. 3 includes a ratio component 314, a quantization component 316, a histogram component 318, and a hashing component 320. The ratio component 314 calculates, computes, or otherwise generates a stretch invariant descriptor for a subset of interest points based on a ratio of the respective positions of interest points included in the subset of interest points (e.g., triples) in a first direction (first direction ratio), and a ratio of the respective positions of the interest points in a second direction (second direction ratio).

For example, in one implementation, the ratio component 314 generates a bi-directional stretch invariant descriptor. The bi-directional stretch invariant descriptor can include a frequency and time invariant descriptor for audio data, or a horizontal and vertical stretch invariant descriptor for image data (e.g., $[(X2-X1)/(X3-X2), (Y2-Y1)/(Y3-Y2)]$). The descriptor includes a first direction ratio (e.g., X-direction, horizontal stretch invariant ratio, or time stretch invariant ratio) of a difference between an X-position (e.g., X-coordinate) of a second interest point (X2), and an X-position of a first interest point (X1) in a triple, and a difference between an X-position of a third interest point (X3), and the X-position of the second interest point (X2) in the triple (e.g., (X2−X1)/(X3−X2)). In addition, the descriptor includes a second direction ratio (e.g., Y-direction, vertical stretch invariant ratio, or frequency stretch invariant ratio) of a difference between a Y-position (e.g., Y-coordinate) of a second interest point (Y2), and a Y-position of a first interest point (Y1) in a triple, and a difference between a Y-position of a third interest point (Y3) and the Y-position of the second interest point (Y2) in the triple (e.g., (Y2−Y1)/(Y3−Y2)).

As an additional or alternative example, in an implementation, the ratio component 314 generates a single direction stretch invariant descriptor. The single direction stretch invariant descriptor includes a time invariant descriptor for audio data (e.g., [(X2−X1)/(X3−X2), Y2/Y1, Y3/Y2]). Transformations of audio spectrograms are typically accompanied by a shift, and the descriptor can be time invariant (e.g., first direction) without being frequency invariant (e.g., second direction). The descriptor includes the first direction or time invariance ratio (e.g., (X2−X1)/(X3−X2)), a second direction ratio (e.g., Y-direction) of a Y-position (e.g., Y-coordinate) of a second interest point (Y2), and a Y-position of a first interest point (Y1) in a triple (e.g., Y2/Y1), and a third dimension ratio of a Y-position of a third interest point (Y3), and the Y-position of the second interest point (Y2) in the triple (e.g., Y3/Y2). It is to be appreciated the spectrogram may be binned, and the ratio component 314 can convert the spectrogram from bins to hertz and/or time. It is to be further appreciated that the foregoing is but an example, and aspects of the innovation are not limited by the direction of the axes. For example, the X-axis can be frequency, and the Y-axis can be time.

The quantization component 316 quantizes ratios included in the descriptors generated by the ratio component 314. For example, in one implementation, the quantization component 316 employs bins for quantization that can be but are not limited to equally sized, and/or computed based on quantiles of a distribution of possible ratios. As an additional or alternative example, in an implementation, the quantization component 316 employs a set of quantized versions of the descriptor having partially (e.g., half) overlapping bins. As an additional or alternative example, in an implementation, the quantization component 316 appends, attaches, or otherwise adds quantized positions for the interest points to the descriptor.

The histogram component 318 constructs a histogram based on the quantized descriptors. Typically, applying a transformation to the media content 104, such as linearly stretching the media content, will not alter the ratios included in the descriptors. Quantizing the ratios, and constructing the histogram based on the descriptors, adaptively encodes the relative ordering of interest points included in the media content 104, and generates a transformation invariant identifier (e.g., the histogram).

Additionally, the encoding component 208, e.g., in FIG. 3, can include a hashing component 320 that determines, calculates or otherwise computes a set of hash values based on the histogram generated by the histogram component 318. The hashing component 320 can employ virtually any hashing algorithm that can be employed with histograms, including, but not limited to, hashing based on random projections, weighted min-wise independent permutations, locality sensitive hashing (MinHash), winner takes all (WTA) hashing, and so forth. For example, applying WTA hashing to the histogram can provide for increased robustness to errors or missed detection on interest points.

Figure 4:
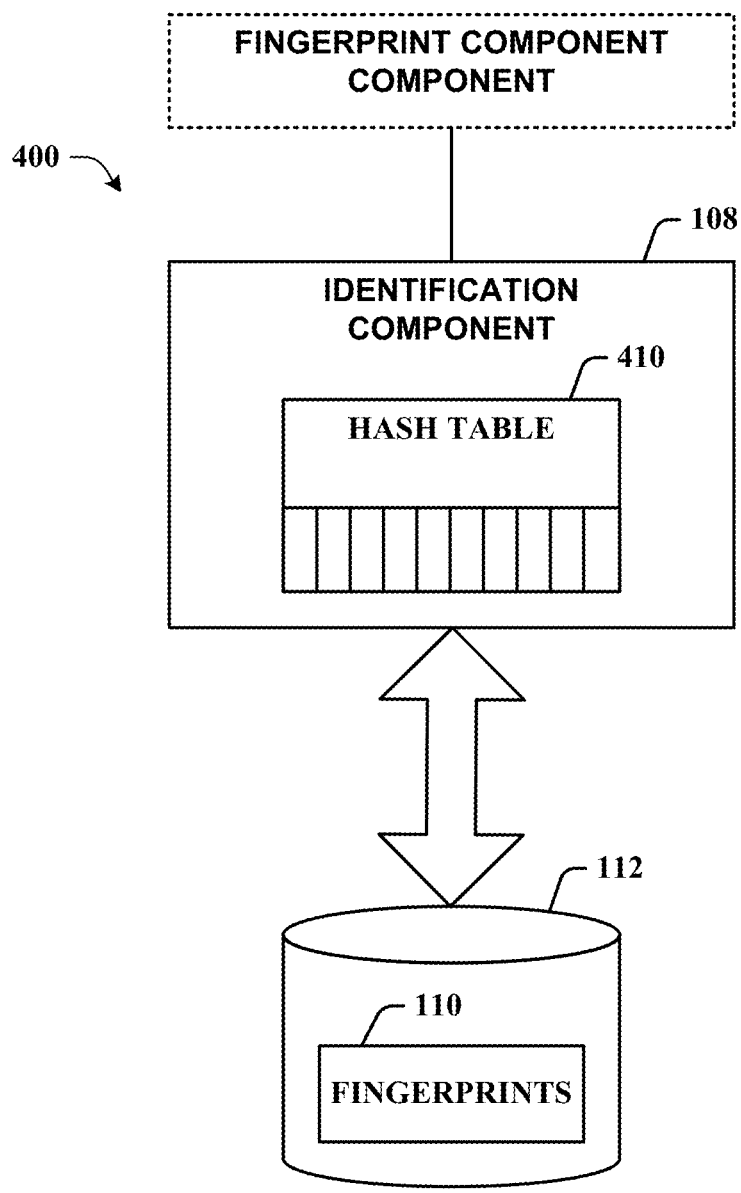
FIG. 4 illustrates an example identification component in accordance with various aspects described in this disclosure.

FIG. 4 illustrates an example identification component 108 in accordance with various aspects described in this disclosure. As discussed, the identification component 108 compares the identifier generated by the fingerprinting component 106 against a set of fingerprints (e.g., identifiers) 110 for known media content, and determines an identity of the media content 104 (or portion of the media content) based at least in part on the comparison. For example, in one implementation, the identification component 108 compares a histogram constructed by the histogram component 318 against a set of histograms (e.g., fingerprints 110) maintained in the data store 112 for known media content, and determines an identity of the media content 104 based on a set of comparison criteria. The comparison criteria includes but is not limited to satisfaction of a matching threshold.

Additionally or alternatively, the identification component 108 can employ the identifier generated by the fingerprinting component 106 to lookup a fingerprint in the set of fingerprints 110. For example, in an exemplary implementation, the identification component 108, e.g., in FIG. 4, includes a hash table 410, and employs one or more hash values generated by the hashing component 320 to lookup a fingerprint 110 in the hash table 410. It is to be appreciated that although the hash table 410 is illustrated as being incorporated in the identification component 108, such implementation is not so limited. For instance, the hash table 410 can be maintained in another location, and the identification component 108 may access the hash table 410, for example, via a network connection.

Figure 5:
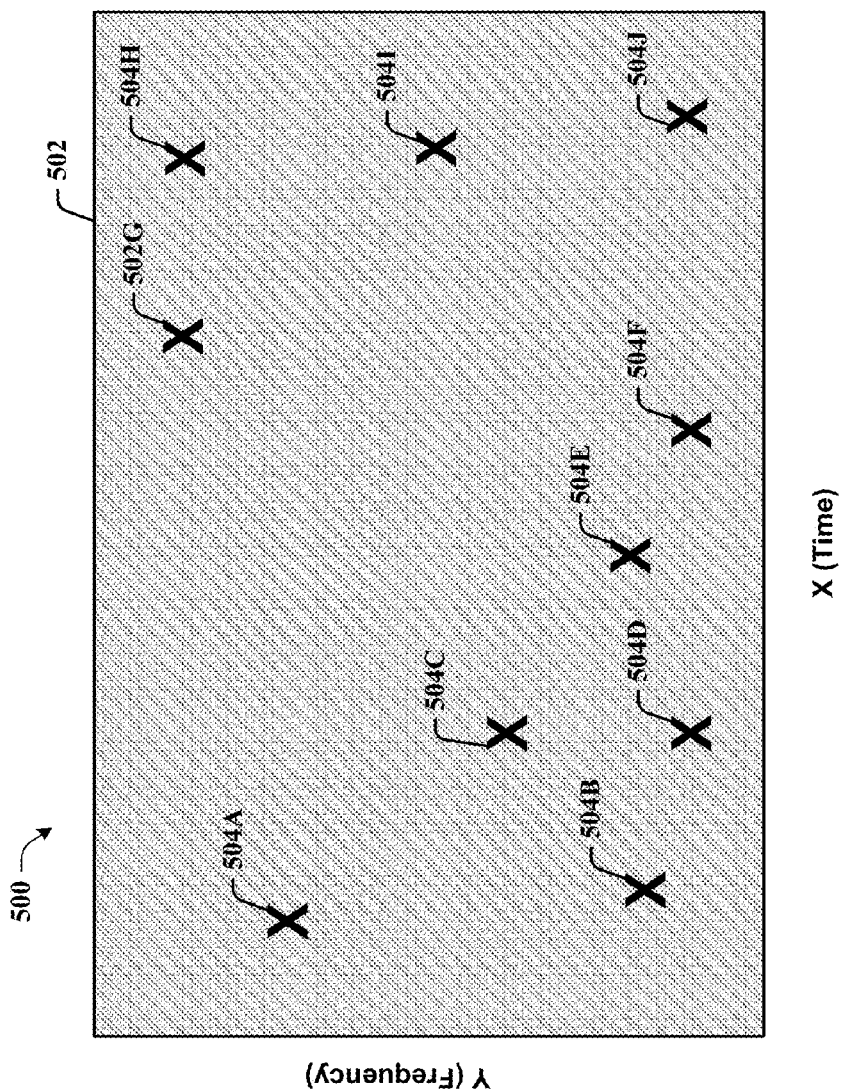
FIG. 5 illustrates a system that provides a non-limiting example of a signal image in accordance with various aspects described in this disclosure.

Turning to FIG. 5, illustrated is an example system 500 that provides a non-limiting example of a signal image 502 in accordance with various aspects described herein. The signal image 502 can include but is not limited to a spectrogram, a waveform plot, an image, and/or a set of images. The signal image 502 includes a set of interest points 504 (e.g., 504A-J). As discussed, the interest points 504 can be selected, detected, or otherwise determined in the signal image 502 based in part on a set of interest point selection criteria (e.g., using the reference component 204). The set of interest point selection criteria can include but is not limited to satisfaction of a predetermined response threshold when compared to a filter, and/or a predetermined reference point location. For example, in one implementation, where the signal image 502 is associated with audio data and/or image data, a Harris operator (e.g., using the Harris component 308), a difference of Gaussians, and/or a Laplacian of Gaussian (LoG) filter (e.g., using the Gaussian component 310) can be applied to the signal image 502, and the interest points 504 can be determined based on satisfaction of a Harris operator response threshold, a difference of Gaussians threshold, and/or a LoG filter response threshold, respectively. As an additional or alternative example, in an implementation, where the signal image 502 is associated with audio data, the interest points are determined by selecting peaks that are local maxima in a time-frequency window of a signal image (e.g., spectrogram) for audio data (e.g., using the peak selection component 312). The local peaks are likely to remain in noisy or distorted audio data, and provide stable interest points. It is to be appreciated that FIG. 5 is not intended as a true representation of a signal image, but rather is merely a simplified illustration for brevity and simplicity of explanation.

Figure 6:
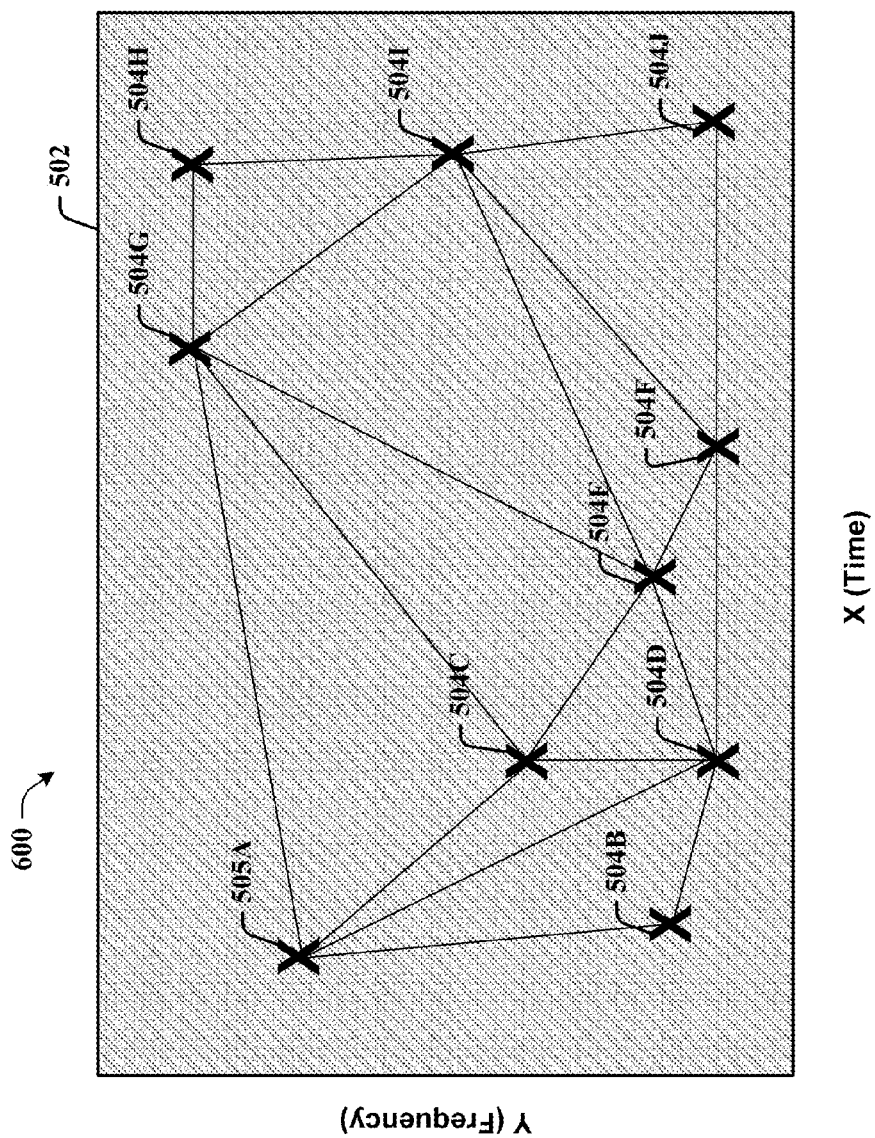
FIG. 6 illustrates a system that provides a non-limiting example of a signal image in accordance with various aspects described in this disclosure.

FIG. 6 illustrates an example system 600 that provides a non-limiting example of a signal image 502 in accordance with various aspects described herein. As discussed, the signal image 502 includes a set of interest points 504 (e.g., 504A-J). In an implementation, interest points 504A-J in the set of interest points 504 are grouped into triangles or subsets of interest points having three interest points (triples) (e.g., using the grouping component 206). For example, interest points 504A-J can be grouped into triples by computing a Delaunay triangulation for interest points 504A-J included in the set of interest points 504. As an additional example, a quantity of triples possible in the set of interest points 504 can be determined, and for n interest points, n^3 triples can be generated, where n is an integer. As yet another example, subsets of two interest points (e.g., 504A and 504B) in the set of interest points 504 can be determined, and a third interest point (e.g., 504D) for each subset of two interest points can be selected to form the triple. As still another example, two interest points can be selected from the set of interest points 504 based on respective distances from a first interest point. For instance, two interest points (e.g., 504G and 504I) having the shortest respective distances to the first interest point (e.g., 504H) can be selected. The distance can be measured in Euclidean distance, or can be the distance on an x-axis. It is also to be appreciated that FIG. 6 is not intended as a true representation of a signal image, but rather is merely a simplified illustration for brevity and simplicity of explanation.

Figure 7:
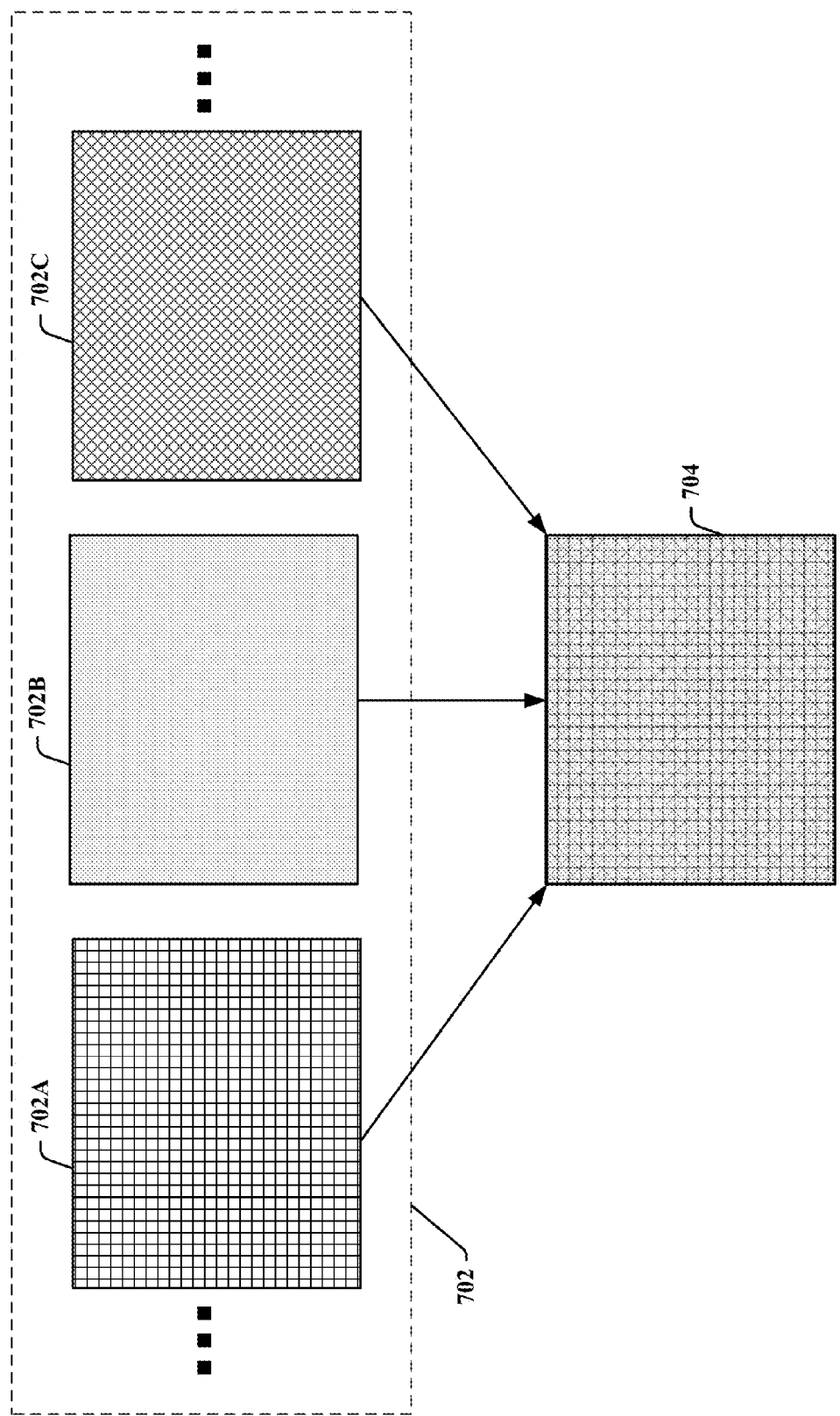
FIG. 7 illustrates a system that provides a non-limiting example of a signal image in accordance with various aspects described in this disclosure.

FIG. 7 illustrates an example diagram of system 700 that generates a signal image for video data 702 in accordance with various aspects described herein. The system 700 includes video data 702. The video data 702 can include a set of images or frames that are displayed sequentially at a given time rate (e.g., 60 frames per second). A subset of the frames 702A-70C can be combined, aggregated, or otherwise averaged to generate an averaged frame 704 (e.g., using the averaging component 304). A value at a set of locations common to each frame included in the subset of frames 702A-702C is averaged to produce the averaged frame 704. For example, a value at a first location in the first frame 702A (e.g., $X1_{702A}$, $Y1_{702A}$) can be 10, the value at the first location in the second frame 702B (e.g., $X1_{702B}$, $Y1_{702B}$) can be 8, and the value at the first location in the third frame 702C (e.g., $X1_{702C}$, $Y1_{702C}$) can be 6. The value at the first location in the averaged frame 704 (e.g., $X1_{704}$, $Y1_{704}$) is the average of the values at the first location of the first frame 702A (e.g., $X1_{702A}$, $Y1_{702A}$), the second frame 702B (e.g., $X1_{702B}$, $Y1_{702B}$), and the third frame 702C (e.g., $X1_{702C}$, $Y1_{702C}$), or 8 (e.g., ((10+8+6)/3)). Aspects of the innovation are not limited to a number of frames averaged to generate an averaged frame (e.g., 704). It is also to be appreciated that FIG. 7 is not intended as a true representation of a signal image, but rather is merely a simplified illustration for brevity and simplicity of explanation.

Non-Limiting Examples of Methods for Transformation Invariant Media Matching

Figure 8:
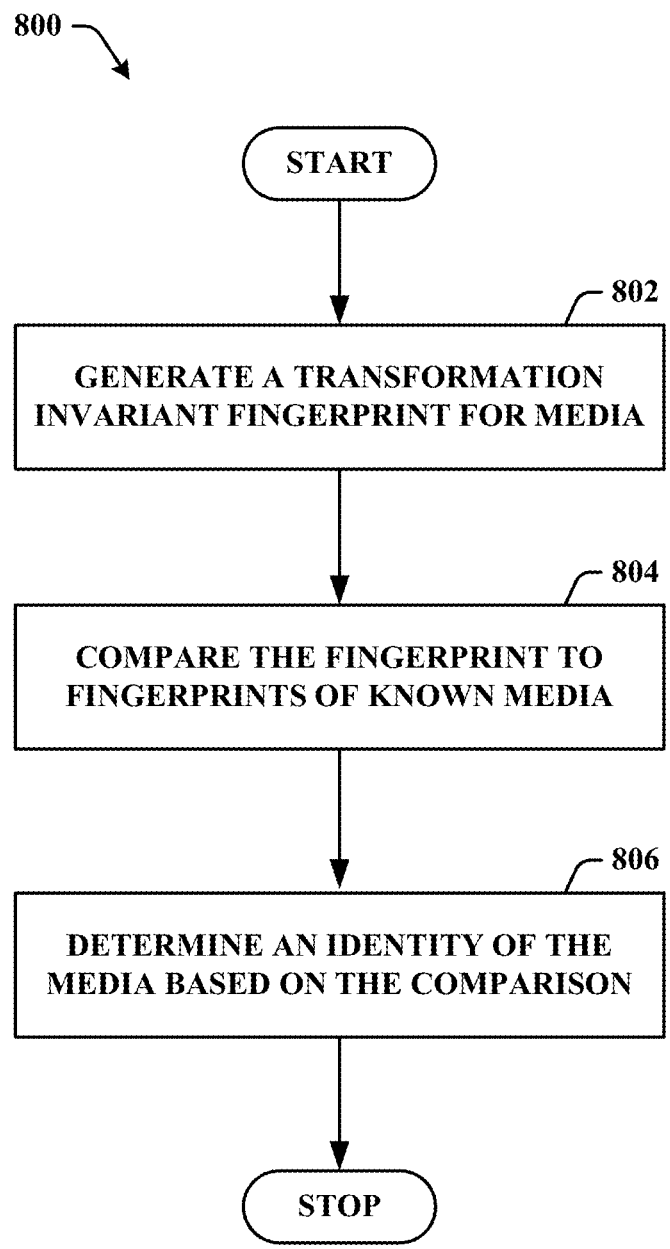
FIGS. 8-10 are example flow diagrams of respective methods for transformation invariant media matching in accordance with various aspects described in this disclosure.
Figure 9:
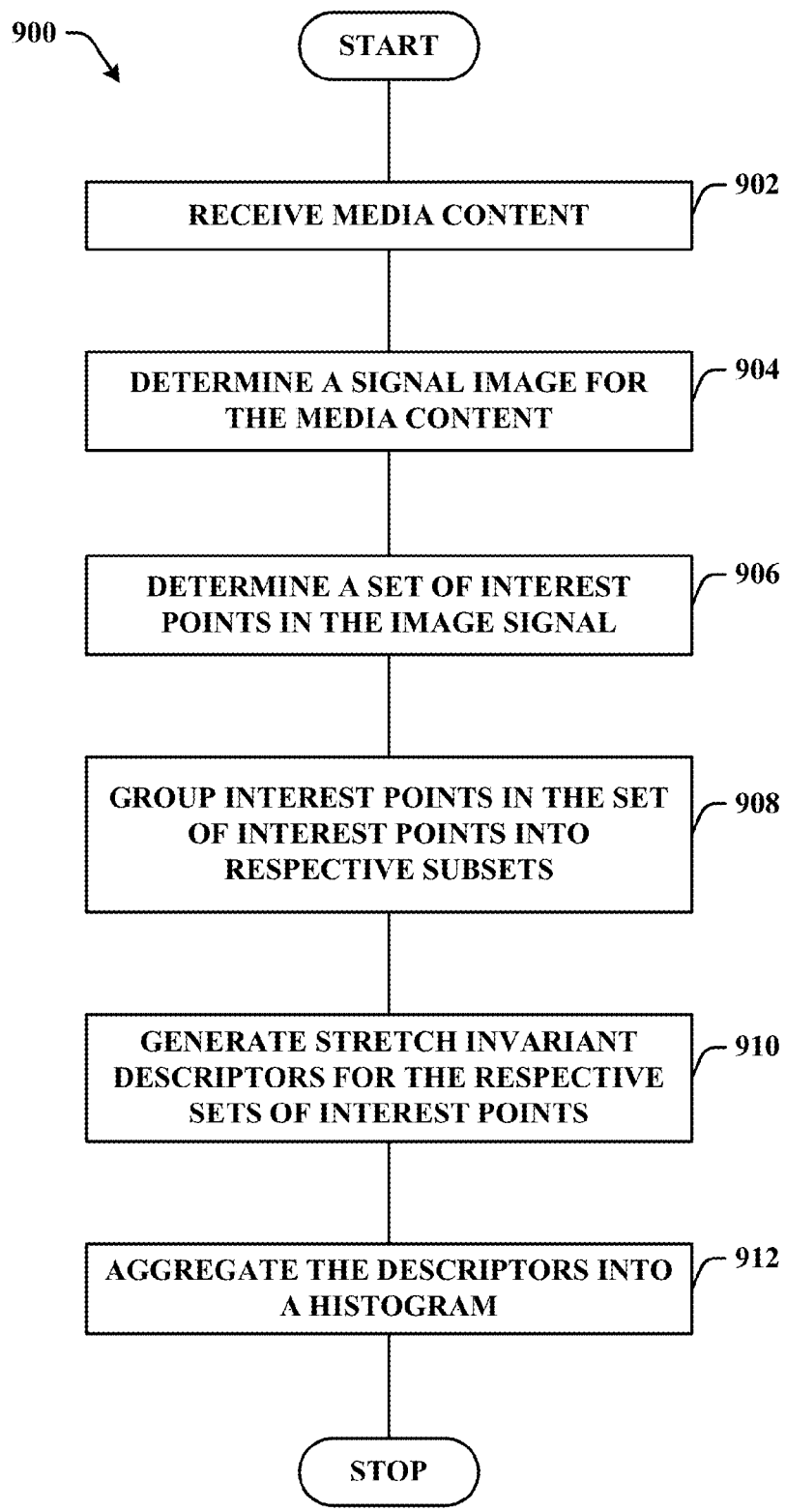
Figure 10:
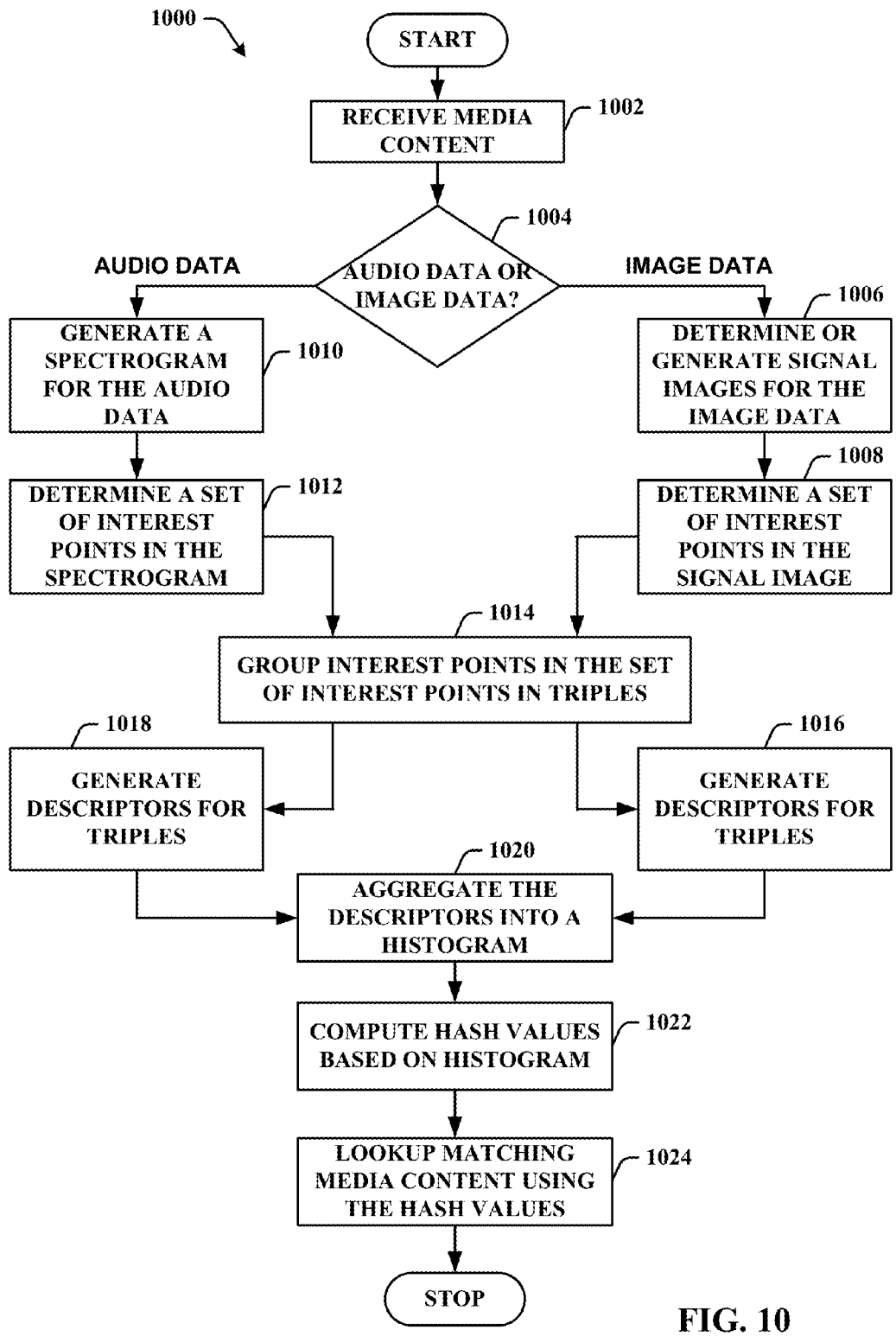

FIGS. 8-10 illustrate various methodologies in accordance with the disclosed subject matter. While, for purposes of simplicity of explanation, the methodologies are shown and described as a series of acts, the disclosed subject matter is not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be appreciated that the methodologies disclosed in this disclosure are capable of being stored on an article of manufacture to facilitate transporting and transferring such methodologies to computers or other computing devices.

Referring now to FIG. 8, illustrated is an example methodology 800 for transformation invariant media matching in accordance with various aspects described in this disclosure. At reference numeral 802, a transformation invariant fingerprint is generated for media content (e.g., using the fingerprinting component 106). The media content can include a signal, an image, a song, a video, and so forth, and the transformation invariant fingerprint is an identifier based on interest points (e.g., peaks, predetermined locations in the image, reference points, etc.) of the media that are unaffected, or marginally affected, by modification or alteration of the media (e.g., time stretch, aspect changes, ratio changes, etc.). For example, in an exemplary implementation, interest points are grouped into respective sets of interest points, and stretch invariant descriptors are generated using the respective sets of interest points. A transformation invariant fingerprint is generated by aggregating the descriptors into a histogram, and/or generating a set of hash values using the histogram.

At reference numeral 804, the transformation invariant fingerprint for the media is compared to a set of fingerprints for known media content (e.g., using the identification component 108). For example, if the media content includes an audio track associated with a movie (movie audio track), then the fingerprint generated for the movie audio track can be compared to a set of fingerprints for known movie audio tracks. At reference numeral 806, the media content can be identified based on the comparison with the set of fingerprints. For example, the media content can be identified as corresponding to a known movie audio track in a set of movie audio tracks, when the transformation invariant fingerprint for the media content meets, exceeds, or otherwise satisfies a matching threshold with a fingerprint for the known movie audio track.

Turning to FIG. 9, illustrated is an example methodology 900 for transformation invariant media matching in accordance with various aspects described in this disclosure. At reference numeral 902, media content is received (e.g., using the media matching component 102). For example, the media content can be received from a user upload to a media hosting service. At reference numeral 904, a signal image is determined or generated for the media content (e.g., using the inspection component 202). The signal image can be included in the media content. As discussed, the signal image can include but is not limited to a spectrogram, a waveform plot, an image, and/or a set of images.

At reference numeral 906, a set of interest points in the signal image is determined based in part on a set of interest point selection criteria. The interest point selection criteria can include but is not limited to satisfaction of a predetermined response threshold when compared to a filter, and/or a predetermined reference point location. For example, in one implementation, peaks in a spectrogram are selected as interest points (e.g., using the peak selection component 312). At reference numeral 908, interest points in the set of interest points are grouped into subsets of interest points based on a set of grouping criteria (e.g., using the grouping component 206). The set of grouping criteria can include but is not limited to a predetermined size of the subsets, a predetermined quantity of groups, and/or a stability of the interest points. For example, in one implementation, a quantity of groups is inversely proportional to the stability of the interest points. For instance, there can be a lesser quantity of groups for a first set of interest points having a first stability, and a greater quantity of groups for a second set of interest points having a second stability, where the first stability is greater than the second stability.

At reference numeral 910, stretch invariant descriptors (descriptors) for the respective subsets of interest points are generated (e.g., using the ratio component 314). For example, the stretch invariant descriptors can be determined based on a ratio of respective positions of interest points included in the subset of interest points in a first direction (first direction ratio), and a ratio of the respective positions of the interest points in a second direction (second direction ratio). In addition, ratios included in the descriptors can be quantized (e.g., using the quantization component 316). At reference numeral 912, the descriptors are aggregated into a histogram over a window of time. Typically, applying a transformation to the media content, such as linearly stretching the media content, will not alter the ratios included in the descriptors. Constructing the histogram based on the descriptors adaptively encodes the relative ordering of interest points included in the media content, and generates a transformation invariant identifier (e.g., the histogram).

FIG. 10 illustrates an example methodology 1000 for transformation invariant media matching in accordance with various aspects described in this disclosure. At reference numeral 1002, media content is received (e.g., using the media matching component 102). For example, the media content can be received from a user upload to a media hosting service. At reference numeral 1004, a determination is made whether the media content includes audio data or image data (e.g., using the inspection component 202). It is to be appreciated that the media content can include audio data and image data. For example, the media content can include a video having both audio data and image data.

At reference numeral 1006, if it is determined that the media content includes image data (image data at reference numeral 1004), then a set of signal images are generated for image data included in the media content (e.g., using the inspection component 202). Video data included in the media content can include a set of images (e.g., frames) that are displayed sequentially at a given time rate (e.g., 60 frames per second). In an implementation, averaged subsets of video data (e.g., frames) included in the media content are generated (e.g., using the averaging component 304). In an additional or alternative implementation, frames in the video data included in the media content are selected at a set of predetermined times and/or predetermined time intervals (e.g., using the time select component 306). Additionally or alternatively, the signal image can be included in the media content.

At reference numeral 1008, a set of interest points (e.g., reference points or stable points) are determined in a signal image (e.g., using the reference component 204) based in part on a set of interest point selection criteria. The interest point selection criteria includes but is not limited satisfaction of a predetermined response threshold when compared to a filter, and/or a predetermined reference point location. For example, in one implementation, a Harris operator can be employed to determine interest points in the image signal (e.g., using the Harris component 308). As an additional or alternative example, in an implementation, a difference of Gaussians and/or a Laplacian of Gaussian (LoG) filter can be employed to detect interest points (e.g., using the Gaussian component 310).

Returning to reference numeral 1004, if it is determined that media content includes audio data (audio data at 1004), then at reference numeral 1010, a spectrogram (e.g., signal image) for audio data included in the media content is generated by applying fast Fourier transforms (FFTs) over windows of an audio signal corresponding to the audio data (e.g., using the spectrogram component 302). At reference numeral 1012, a set of interest points (e.g., reference points or stable points) are selected in the spectrogram based in part on the set of interest point selection criteria (e.g., using the reference component 204). For example, in one implementation, a set of peaks (or interest points) that are local maxima in the spectrogram are determined (e.g., using the peak selection component 312). It is to be appreciated that the methodology can determine interest points in the spectrogram, in a similar manner employed to determine interest points in a signal image for image data (e.g., at reference numeral 1008). For example, in one implementation, a Harris operator (e.g., using the Harris component 308), a difference of Gaussians, and/or LoG filter (e.g., using the Gaussian component 310) can be employed to facilitate detection of interest points in the spectrogram.

At reference numeral 1014, interest points determined in signal images corresponding to audio data (e.g., spectrogram) and/or image data (e.g., selected frames, averaged frames, image data, etc.) are grouped into subsets of interest points based on a set of grouping criteria (e.g., the grouping component 206). The set of grouping criteria can include but is not limited to a predetermined size of the subsets, a predetermined quantity of groups, and/or a stability of the interest points. For example, in one implementation, interest points are grouped into triangles or subsets having three interest points (e.g., generates sets of triples). Aspects of the innovation are not limited to a particular technique for generating sets of triples. For example, a Delaunay triangulation can be computed for interest points included in the set of interest points to generate sets of triples. As an additional example, a quantity of possible triples in the set of interest points can be determined, and for n interest points, n^3 triples can be generated, where n is an integer. As yet another example, subsets of two interest points in the set of interest points can be determined, and a third interest point for each subset of two interest points can be selected to generate a triple. As still another example, two interest points can be selected based on respective distances from a first interest point. For instance, the two interest points having the shortest respective distances to the first interest point can be selected. The distance can be measured in Euclidean distance, or can be the distance on an one axis (e.g., x-axis).

At reference numeral 1016, a bi-directional stretch invariant descriptor for a subset of interest points (e.g., a triple) in a signal image associated with image data is generated based on a ratio of the respective positions of interest points included in the subset of interest points in a first direction (first direction ratio), and a ratio of the respective positions of the interest points in a second direction (second direction ratio) (e.g., using the ratio component 314). For example, in one implementation, a frequency and time invariant descriptor is generated for audio data, or a horizontal and vertical stretch invariant descriptor is generated for image data (e.g., [(X2−X1)/(X3−X2), (Y2−Y1)/(Y3−Y2)]). The descriptor includes a first direction ratio (e.g., X-direction horizontal stretch invariant ratio, or time stretch invariant ratio) of a difference between an X-position (e.g., X-coordinate) of a second interest point (X2), and an X-position of a first interest point (X1) in a triple, and a difference between an X-position of a third interest point (X3), and the X-position of the second interest point (X2) in the triple (e.g., (X2−X1)/(X3−X2)). In addition, the descriptor includes a second direction ratio (e.g., Y-direction, vertical stretch invariant ratio, or frequency stretch invariant ratio) of a difference between a Y-position (e.g., Y-coordinate) of a second interest point (Y2), and a Y-position of a first interest point (Y1) in a triple, and a difference between a Y-position of a third interest point (Y3) and the Y-position of the second interest point (Y2) in the triple (e.g., (Y2−Y1)/(Y3−Y2)). It is to be appreciated that the foregoing can be employed to generate a frequency and time invariant descriptor for a subset of interest points (e.g., a triple) in a signal image associated with audio data and/or image data (e.g., at reference numeral 1018).

At reference numeral 1018, a single direction stretch invariant descriptor for a subset of interest points (e.g., a triple) in a signal image associated with audio data is generated (e.g., using the ratio component 314). Transformations of audio spectrograms are typically accompanied by a shift, and the descriptor can be time invariant (e.g., first direction) without being frequency invariant (e.g., second direction). For example, in one implementation, the descriptor includes a time invariance ratio (e.g., (X2−X1)/(X3−X2)), a second direction ratio (e.g., Y-direction) of a Y-position (e.g., Y-coordinate) of a second interest point (Y2), and a Y-position of a first interest point (Y1) in a triple (e.g., Y2/Y1), and a third dimension ratio of a Y-position of a third interest point (Y3), and the Y-position of the second interest point (Y2) in the triple (e.g., Y3/Y2). It is to be appreciated the spectrogram may be binned, and can be converted from bins to hertz and/or time.

At reference numeral 1020, the descriptors are aggregated into a histogram over a window of time (e.g., using the histogram component 318). Additionally or alternatively, in an implementation, ratios included in the descriptors can be quantized (e.g., using the quantization component 316). Typically, applying a transformation to the media content, such as linearly stretching the media content, will not alter the ratios included in the descriptors. Quantizing the ratios and/or constructing the histogram based on the descriptors, adaptively encodes the relative ordering of interest points included in the media content, and generates a transformation invariant identifier (e.g., the histogram).

At reference numeral 1022, a set of hash values can be computed using the histogram at predetermined intervals (e.g., using the hashing component 320). Virtually any hashing algorithm that can be employed with histograms can be used to compute the set of hash values, including, but not limited to, hashing based on random projections, weighted min-wise independent permutations locality sensitive hashing (MinHash), winner takes all (WTA) hashing, and so forth. For example, applying WTA hashing to the histogram can provide for increased robustness to errors or missed detection on interest points. At reference numeral 1024, known media content matching the media content, or a portion of the media content, is looked-up in hash table (e.g., using hash table 410) using the set of hash values. For example, if the media content includes a song, then the hash value for the media content can be used to lookup known songs in a hash table corresponding to, or matching, the song included in the media content.

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store where media may be found. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the smooth streaming mechanisms as described for various embodiments of this disclosure.

Figure 11:
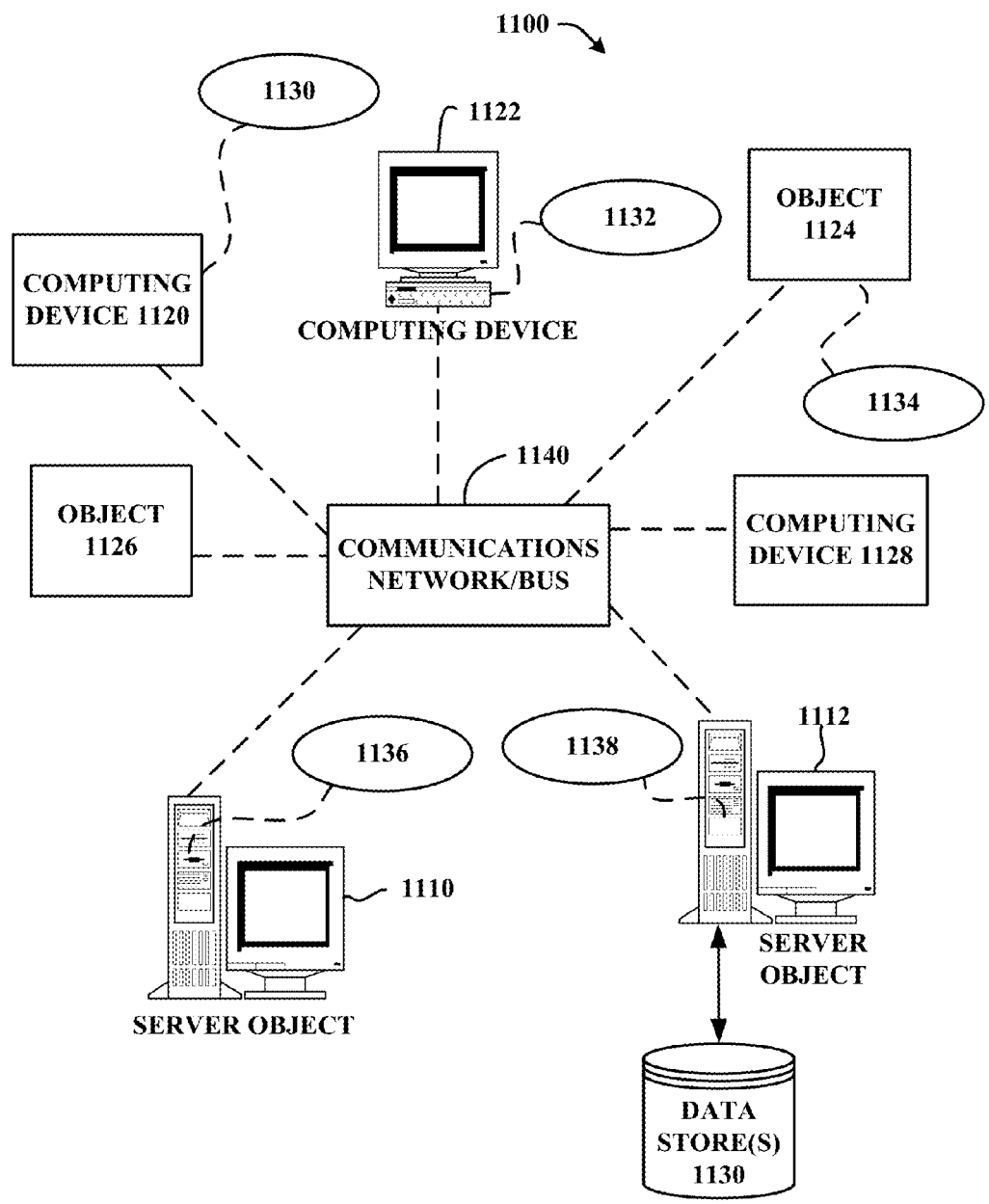
FIG. 11 is a block diagram representing an exemplary non-limiting networked environment in which the various embodiments can be implemented.

FIG. 11 provides a schematic diagram of an exemplary networked or distributed computing environment. The distributed computing environment comprises computing objects 1110, 1112, etc. and computing objects or devices 1120, 1122, 1124, 1126, 1128, etc., which may include programs, methods, data stores, programmable logic, etc., as represented by applications 1130, 1132, 1134, 1136, 1138. It can be appreciated that computing objects 1111, 1112, etc. and computing objects or devices 1120, 1122, 1124, 1126, 1128, etc. may comprise different devices, such as personal data assistants (PDAs), audio/video devices, mobile phones, MP3 players, personal computers, tablets, laptops, etc.

Each computing object 1110, 1112, etc. and computing objects or devices 1120, 1122, 1124, 1126, 1128, etc. can communicate with one or more other computing objects 1110, 1112, etc. and computing objects or devices 1120, 1122, 1124, 1126, 1128, etc. by way of the communications network 1140, either directly or indirectly. Even though illustrated as a single element in FIG. 11, network 1140 may comprise other computing objects and computing devices that provide services to the system of FIG. 11, and/or may represent multiple interconnected networks, which are not shown. Each computing object 1110, 1112, etc. or computing objects or devices 1120, 1122, 1124, 1126, 1128, etc. can also contain an application, such as applications 1130, 1132, 1134, 1136, 1138, that might make use of an API, or other object, software, firmware and/or hardware, suitable for communication with or implementation of the smooth streaming provided in accordance with various embodiments of this disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be employed. The "client" is a member of a class or group that uses the services of another class or group to which it is not related. A client can be a process, e.g., roughly a set of instructions or tasks, that requests a service provided by another program or process. The client may be or use a process that utilizes the requested service without having to "know" any working details about the other program or the service itself.

In a client/server architecture, particularly a networked system, a client is usually a computer that accesses shared network resources provided by another computer, e.g., a server. In the illustration of FIG. 11, as a non-limiting example, computing objects or devices 1120, 1122, 1124, 1126, 1128, etc. can be thought of as clients and computing objects 1111, 1112, etc. can be thought of as servers where computing objects 1110, 1112, etc. provide data services, such as receiving data from client computing objects or devices 1120, 1122, 1124, 1126, 1128, etc., storing of data, processing of data, transmitting data to client computing objects or devices 1120, 1122, 1124, 1126, 1128, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network/bus 1140 is the Internet, for example, the computing objects 1110, 1112, etc. can be Web servers with which the client computing objects or devices 1120, 1122, 1124, 1126, 1128, etc. communicate via any of a number of known protocols, such as the hypertext transfer protocol (HTTP). Objects 1110, 1112, etc. may also serve as client computing objects or devices 1120, 1122, 1124, 1126, 1128, etc., as may be characteristic of a distributed computing environment.

Exemplary Computing Device

As mentioned, advantageously, the techniques described herein can be applied to any device suitable for implementing various embodiments described herein. Handheld, portable and other computing devices and computing objects of all kinds are contemplated for use in connection with the various embodiments, e.g., anywhere that a device may wish to read or write transactions from or to a data store. Accordingly, the below general purpose remote computer described below in FIG. 12 is but one example of a computing device.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

Figure 12:
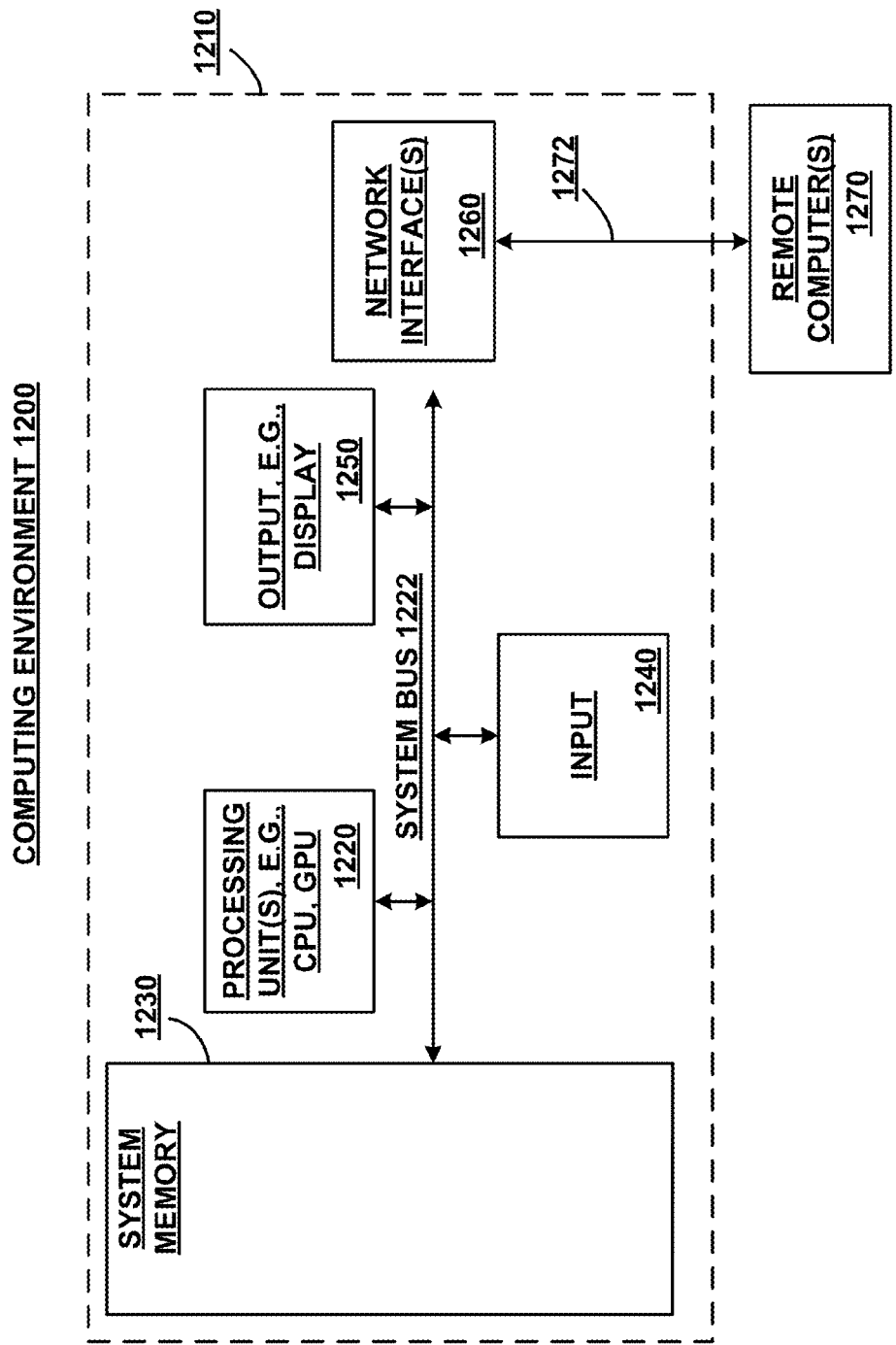
FIG. 12 is a block diagram representing an exemplary non-limiting computing system or operating environment in which the various embodiments may be implemented.

FIG. 12 thus illustrates an example of a suitable computing system environment 1200 in which one or aspects of the embodiments described herein can be implemented, although as made clear above, the computing system environment 1200 is only one example of a suitable computing environment and is not intended to suggest any limitation as to scope of use or functionality. Neither is the computing environment 1200 be interpreted as having any dependency or requirement relating to any one or combination of components illustrated in the exemplary operating environment 1200.

With reference to FIG. 12, an exemplary remote device for implementing one or more embodiments includes a general purpose computing device in the form of a computer 1210. Components of computer 1210 may include, but are not limited to, a processing unit 1220, a system memory 1230, and a system bus 1222 that couples various system components including the system memory to the processing unit 1220.

Computer 1210 includes a variety of computer readable media and can be any available media that can be accessed by computer 1210. The system memory 1230 may include computer storage media in the form of volatile and/or nonvolatile memory such as read only memory (ROM) and/or random access memory (RAM). By way of example, and not limitation, memory 1230 may also include an operating system, application programs, other program modules, and program data.

A user can enter commands and information into the computer 1210 through input devices 1240. A monitor or other type of display device is also connected to the system bus 1222 via an interface, such as output interface 1250. In addition to a monitor, computers can also include other peripheral output devices such as speakers and a printer, which may be connected through output interface 1250.

The computer 1210 may operate in a networked or distributed environment using logical connections to one or more other remote computers, such as remote computer 1270. The remote computer 1270 may be a personal computer, a server, a router, a network PC, a peer device or other common network node, or any other remote media consumption or transmission device, and may include any or all of the elements described above relative to the computer 1210. The logical connections depicted in FIG. 12 include a network 1272, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to publish or consume media in a flexible way.

The word "exemplary" is used herein to mean serving as an example, instance, or illustration. For the avoidance of doubt, this matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a component can come in the form of specially designed hardware; generalized hardware made specialized by the execution of software thereon that enables the hardware to perform specific function (e.g., coding and/or decoding); software stored on a computer readable medium; or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components are communicatively coupled to other sub-components within its parent components as applicable based on the description provided herein, including in instances when connector lines are not illustrated in a figure for ease of readability. Sub-components can also be implemented as sub-components communicatively coupled to other components not included within its parent components. Sub-components can further be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described above, methodologies that may be implemented in accordance with the described subject matter will be better appreciated with reference to the flowcharts of the various figures. While for purposes of simplicity of explanation, the methodologies are shown and described as a series of blocks, the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:

1. A system, comprising:
a memory storing computer executable components; and
a processor configured to execute computer executable components stored in the memory comprising:
a reference component that determines a set of interest points in a signal image;
a grouping component that generates a plurality of subsets of interest points by grouping interest points of the set of interests points, wherein the grouping component determines a quantity of subsets to generate based upon a stability of the set of interest points determined according to stability criteria, wherein the quantity is inversely proportional to the stability of the set of interest points;
a descriptor component that, for each subset of the plurality of subsets of interest points, generates a respective stretch invariant descriptor based upon a ratio of positions, in a first direction, of interest points included in the subset, and a ratio of positions, in a second direction, of the interest points in the subset, where the subset of interest points comprises three interest points (X1, Y1), (X2, Y2), and (X3, Y3), the ratio in the first direction comprises (X2−X1)/(X3−X2), and the ratio in the second direction comprises (Y2−Y1)/(Y3−Y2); and
an identification component that identifies a media content associated with the signal image based upon a comparison of the stretch invariant descriptors of the plurality of subsets against reference descriptors associated with a set of known media content.

2. The system of claim 1, wherein the first direction is representative of time and the second direction is representative of frequency.

3. The system of claim 1, wherein the reference component selects peaks that are local maxima in the signal image to determine the interest points.

4. The system of claim 1, further comprising a quantization component that quantizes the ratios in the stretch invariant descriptor.

5. The system of claim 4, wherein the a quantization component employs bins to quantize the ratios.

6. A method, comprising:
  selecting, by a system including a processor, a set of interest points in a graphical representation of a media content;
  generating, by the system, a plurality of subsets of interest points by grouping interest points of the set of interests points, wherein a quantity of subsets to generate is determined based upon a stability of the set of interest points determined according to stability criteria, wherein the quantity is inversely proportional to the stability of the set of interest points;
  for each subset of the plurality of subsets of interest points, generating, by the system, a respective stretch invariant descriptor based upon a ratio of positions, in a first direction, of interest points included in the subset, and a ratio of positions, in a second direction, of the interest points in the subset, where the subset of interest points comprises three interest points $(X1, Y1)$, $(X2, Y2)$, and $(X3, Y3)$, the ratio in the first direction comprises $(X2-X1)/(X3-X2)$, and the ratio in the second direction comprises $(Y2-Y1)/(Y3-Y2)$; and
  identifying, by the system, a known media content associated with the media content based upon a comparison of the stretch invariant descriptors of the plurality of subsets against reference descriptors associated with a set of known media content.

7. The method of claim 6, wherein the first direction is representative of time and the second direction is representative of frequency.

8. The method of claim 6, wherein the selecting the set of interest points comprises selecting peaks that are local maxima in the graphical representation of the media content to determine the interest points.

9. The method of claim 6, further comprising quantizing the ratios in the stretch invariant descriptor.

10. The method of claim 9, wherein the quantizing the ratios employs bins.

11. A non-transitory computer-readable medium having instructions stored thereon that, in response to execution, cause a system including a processor to perform operations comprising:
  identifying a set of interest points in a graphical representation of a media content;
  generating a plurality of subsets of interest points by grouping interest points of the set of interests points, wherein a quantity of subsets to generate is determined based upon a stability of the set of interest points determined according to stability criteria, wherein the quantity is inversely proportional to the stability of the set of interest points;
  for each subset of the plurality of subsets of interest points, producing a respective stretch invariant descriptor based upon a ratio of positions, in a first direction, of interest points included in the subset, and a ratio of positions, in a second direction, of the interest points in the subset, where the subset of interest points comprises three interest points $(X1, Y1)$, $(X2, Y2)$, and $(X3, Y3)$, the ratio in the first direction comprises $(X2-X1)/(X3-X2)$, and the ratio in the second direction comprises $(Y2-Y1)/(Y3-Y2)$; and
  identifying a known media content associated with the media content based upon a comparison of the stretch invariant descriptors of the plurality of subsets against reference descriptors associated with a set of known media content.

12. The non-transitory computer-readable medium of claim 11, wherein the first direction is representative of time and the second direction is representative of frequency.

13. The non-transitory computer-readable medium of claim 11, the operations further comprising quantizing the ratios in the stretch invariant descriptor.

14. The non-transitory computer-readable medium of claim 13, wherein the quantizing the ratios employs bins.

* * * * *